United States Patent [19]
Tamada et al.

[11] Patent Number: 5,168,388
[45] Date of Patent: Dec. 1, 1992

[54] OPTICAL WAVEGUIDE DEVICE AND OPTICAL SECOND HARMONIC GENERATOR USING THE SAME

[75] Inventors: Hitoshi Tamada; Masaki Saitoh, both of Kanagawa; Chiharu Isobe, Tokyo, all of Japan

[73] Assignee: Sony Corporation, Tokyo, Japan

[21] Appl. No.: 686,434

[22] Filed: Apr. 17, 1991

[30] Foreign Application Priority Data

Apr. 19, 1990 [JP] Japan .................................. 2-103763
Jul. 30, 1990 [JP] Japan .................................. 2-201731

[51] Int. Cl.$^5$ .......................... H03F 7/00; G02B 6/12
[52] U.S. Cl. ..................................... 359/328; 385/122; 385/130
[58] Field of Search .................... 350/96.12; 359/328, 359/326; 358/122, 130; 372/22

[56] References Cited

U.S. PATENT DOCUMENTS

| | | | |
|---|---|---|---|
| 4,740,265 | 4/1988 | Bierlein et al. | 350/96.12 |
| 4,763,019 | 8/1988 | Duguay et al. | 350/96.12 |
| 5,022,729 | 6/1991 | Tamada et al. | 350/96.12 |

FOREIGN PATENT DOCUMENTS 0365039 4/1990 European Pat. Off. .

OTHER PUBLICATIONS

J. Opt. Soc. Am B/vol. 6, No. 4, Apr., 1989, pp. 622–633; "Potassium Titanyl Phosphate: Properties and New Applications", by John D. Bierlein et al.

*Primary Examiner*—James W. Davie
*Attorney, Agent, or Firm*—Hill, Van Santen, Steadman & Simpson

[57] ABSTRACT

An optical waveguide device is disclosed which comprises a $KTiOPO_4$ single crystal substrate and an amorphous optical waveguide formed of $Ta_2O_5$ or $Ta_2O_5$ doped with $TiO_2$. A second harmonic generator device in the form of the Cerenkov radiation using the optical waveguide has high SHG efficiency. Since the Cerenkov angle can be made small by optimizing the dimensions, the spread angle of the SHG light can be made small.

12 Claims, 7 Drawing Sheets

OPTICAL WAVEGUIDE DEVICE AND OPTICAL SECOND HARMONIC GENERATOR USING THE SAME

BACKGROUND OF THE INVENTION

The present invention relates to an optical waveguide device and an optical second harmonic generator device in the form of Cerenkov radiation using the optical waveguide device.

Upon the reception of a light radiation of an angular frequency $\omega(2\pi f$, where f is a frequency), an optical second harmonic generator device (hereinafter referred to as a "SHG" generates a second harmonic light radiation of an angular frequency $2\omega$. The optical SHG broadens the wavelength range to expand the laser application field and optimizes the utilization of laser light in various technical fields. For example, the use of laser light of a short wavelength increases recording density in optical or magneto-optical recording and reproducing using laser light.

A Cerenkov radiation type SHG, which applies a fundamental optical wave to a linear optical waveguide formed on an optically nonlinear single crystal substrate and generates a second harmonic wave, is disclosed, for example, in Applied Physics Letters, 17, 447 (1970). This SHG is fabricated by forming a polycrystalline ZnS optical waveguide on a ZnO nonlinear single crystal substrate and is capable of generating a second harmonic having a wavelength of 0.53 μm by using a Nd:YAG laser emitting laser light having a wavelength of 1.06 μm. However, since the waveguide is formed of a polycrystalline material, the SHG suffers from a large propagation loss. Furthermore, since the ZnO substrate has a small nonlinear d-constant, the SHG efficiency is considerably low.

The SHG disclosed in Japanese Patent Laid-open (Kokai) No. 61-189524 employs a LiNbO$_3$ (hereinafter referred to as "LN") substrate with a proton exchanged LiNbO$_3$ optical waveguide. This SHG has a high SHG efficiency $\eta$ of 1% or higher.

The efficiency $\eta$ of a Cerenkov radiation SHG is expressed by:

$$\eta \alpha d^2 \cdot p^n l$$

where d is the d constant of the nonlinear optical material, p is the power density of the fundamental wave and l is the interaction length. Accordingly, it is necessary for the enhancement of the efficiency to use a material having a large d constant, to increase the power density of the fundamental wave and to increase the interaction length l. The value of the d constant of a material is dependent on the geometric relation between the crystal orientation and the polarization of the fundamental wave. For LN, the maximum is $|d_{33}| = 34.4 \times 10^{-12}$(m/V). With proton-exchanged LN, only the refractive index ne for extraordinary light can be increased. Since the surfaces of an X-plate and a Y-plate are roughened by etching during proton exchange, only a Z-plate (a substrate having major surfaces perpendicular to a z-axis parallel to the c-axis) of nonlinear single crystal LN can be used only for a TM mode, and hence a complicated system is necessary to couple the SHG optically to a semiconductor laser light source. The maximum difference Δn between the refractive index of the waveguide and the refractive index of the substrate is on the order of 0.14. Accordingly, the light confinement performance, i.e., the SHG efficiency, is limited. Furthermore, proton exchange is effective only for LN, and LiTaO$_3$ or KTiOPO$_4$ (hereinafter referred to as "KTP") cannot be used.

Since the Cerenkov radiation angle when a SHG employing a LN substrate operates at its maximum efficiency is a comparatively large angle of about 16°, the generated second harmonic wave is reflected by the interface between the backside of the substrate and, for example, air, and a plurality of light radiations are emitted when the interaction length l of the substrate, i.e., the size of the substrate along the direction of travel of light, is increased to increase the SHG efficiency $\eta$. Thus it is necessary to eliminate the reflected light radiations or to increase the thickness of the substrate. A focusing optics for the generated second harmonic light is complicated.

A SHG disclosed in Applied Physics Letters, 50, 1216(1987) employs a nonlinear KTP single crystal substrate. An optical waveguide is formed on the nonlinear KTP single crystal substrate by an ion exchange process. This SHG utilizes mode dispersion in the optical waveguide.

A KTP single crystal has a comparatively large nonlinear constant d$^{33}$ of $13.7 \times 10^{-12}$ (m/V), is transparent to light radiation in the blue light wavelength range, and has refractive indices $n_x = 1.748$, $n_y = 1.755$ and $n_z = 1.840$ for a light radiation having a wavelength of 0.84 μm, Which are far smaller than those of LiNbO$_3$ (LN) and LiTaO$_3$.

However, the SHG efficiency of the SHG employing an optical waveguide formed by an ion exchange process is practically excessively sensitive to parameters including the wavelength of the fundamental wave and the depth of the optical waveguide. Thus, it is rather difficult to practically utilize the ion exchange process. Accordingly, the practical application of a nonlinear KTP single crystal substrate, which has a small refractive index n and is expected to ensure the satisfactory light confinement effect of an optical waveguide formed thereon, to a SHG has been desired.

OBJECT AND SUMMARY OF THE INVENTION

Accordingly, it is an object of the present invention to provide an improved optical waveguide device.

It is another object of the present invention to provide an optical waveguide device improved with respect to propagation loss.

It is a further object of the present invention to provide a second harmonic generator device using an optical waveguide which is improved in SHG efficiency.

It is a still further object of the present invention to provide a second harmonic generator device in the form of Cerenkov radiation having a small Cerenkov angle which has improved efficiency and can simplify focusing optics being employed.

According to one aspect of the present invention, there is provided an optical waveguide device which comprises a KTiOPO$_4$ single crystal substrate and an amorphous optical waveguide formed of Ta$_2$O$_5$ or Ta$_2$O$_5$ doped with TiO$_2$.

By optimizing the dimensions, the Cerenkov angle of the SHG device using the optical waveguide can be made as small as 1 degree, and a spread angle of the SHG light transverse direction can be made substantially equal to the Cerenkov angle.

DESCRIPTION OF THE PREFERRED EMBODIMENTS

The present invention intends to solve the foregoing problems including a large propagation loss when the waveguide is formed of a polycrystalline material, the possibility of operation being limited only to the TM mode, and the limited maximum efficiency due to the insufficient refractive index difference $\Delta n$. With the invention, the practical application of the KTP substrate to an optical waveguide device is achieved, particularly, a SHG. An optical output at a high efficiency obtained, and characteristics are improved.

The applicant of the present application proposed previously a Cerenkov radiation type optical second harmonic generator device (SHG) comprising a substrate formed of a nonlinear optical material, and an amorphous optical waveguide formed on the substrate and formed of $Ta_2O_5$ doped with $TiO_2$ in U.S. patent application No. 424768/filed Oct. 20, 1989, now U.S. Pat. No. 5,022,729, issued Jun. 11, 1991. This SHG is capable of operating at a high efficiency. The light confinement effect, and hence the SHG efficiency, has been improved by increasing the refractive index difference between the KTP and the waveguide, and the focusing optics has been simplified by reducing the Cerenkov radiation angle through further studies.

Figure 1:
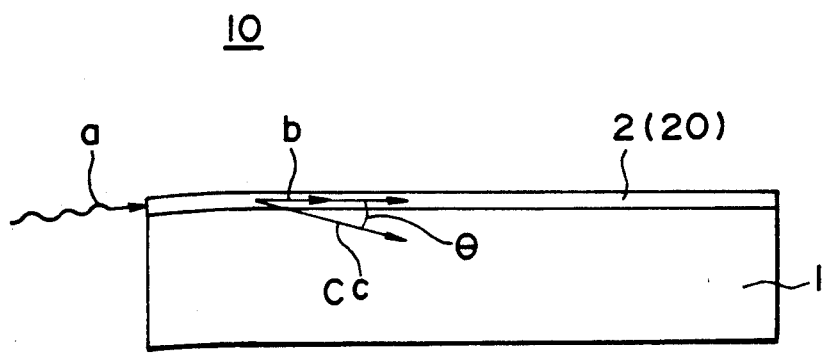
FIGS. 1 and 3 are enlarged schematic sectional view of the optical waveguide device in preferred embodiments according to the present invention.

FIG. 1 is an enlarged schematic sectional view of an optical waveguide device in a preferred embodiment according to the present invention, taken along the direction of travel of light.

As shown in FIG. 1, the optical waveguide device embodying the present invention comprises a KTiOPO$_4$ single crystal substrate (1), and an amorphous optical waveguide (2) formed on the substrate (1) and formed of $Ta_2O_5$.

The optical waveguide device embodying the present invention comprising a KTP crystal substrate, and an optical waveguide formed, for example, of a thin film of $Ta_2O_5$, provides a large refractive index difference $\Delta n$ between the KTP substrate and the $Ta_2O_5$ waveguide in the range of 0.33 to 0.42, and is capable of generating SHG light at a high efficiency.

The KTP substrate reduces the Cerenkov radiation angle, simplifies the focusing optics for the generated light, and improves the characteristics.

Although it has been impossible to generate a SHG light in a blue light wavelength range by the conventional SHG employing a KTP crystal substrate and an ion-exchanged waveguide, the optical waveguide device in accordance with the present invention is capable of satisfactorily generating a SHG light in a blue light wavelength range.

The optical waveguide formed of $Ta_2O_5$ or $Ta_2O_5$ doped with $TiO_2$ is deposited on a KTP single crystal substrate. When $Ta_2O_5$ doped with $TiO_2$ is used, $Ta_2O_5$ is doped with $TiO_2$ so that $0 \leq Ti/(Ti+Ta) \leq 60$ (atomic percent).

As shown in FIG. 1, an optical waveguide device 10 is fabricated by depositing undoped $Ta_2O_5$ (Ti/(Ti+Ta)=0) in a so-called ridge optical waveguide 2 on a KTP single crystal a-plate, i.e., a single crystal plate having surfaces perpendicular to the a-axis, as a substrate 1.

Figure 2A:
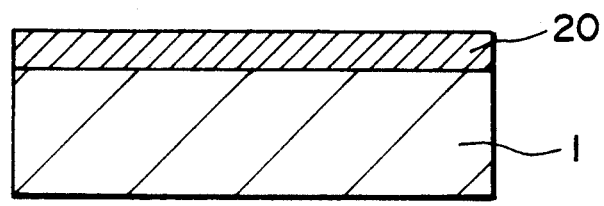
FIGS. 2A to 2C are enlarged schematic sectional views to explain a process for manufacturing the optical waveguide device of the present invention.

An example of a process for forming the optical waveguide device 10 will be described with reference to FIGS. 2A to 2C. First, as shown in FIG. 2A, a $Ta_2O_5$ amorphous thin film 20 having a thickness, for example, of 2050Å is formed by a CVD process (chemical vapor deposition process) using tantalum pentaethoxide $(Ta(OC_2H_5)_5)$ over the entire area of the surface of a substrate 1 formed of a KTP single crystal a-plate. During the CVD process, the substrate is maintained at a predetermined temperature.

Figure 2B:
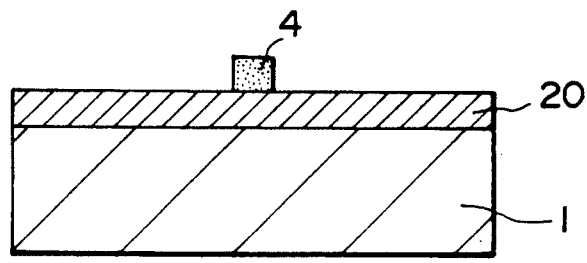
Figure 2C:
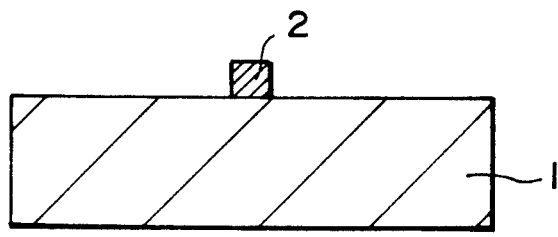

Then, as shown in FIG. 2B, an etching resist mask 4 having the pattern of a desired waveguide, for example a stripe perpendicular to the paper in FIGS. 2A, 2B and 2C, is formed on the $Ta_2O_5$ amorphous thin film 20 by known photolithographic processes.

Then, as shown in FIG. 2C, the $Ta_2O_5$ amorphous thin film 20 is subjected to, for example, a RIE process (reactive ion etching process) to complete the optical waveguide device 10 having a ridge amorphous waveguide 2.

As shown in FIG. 1, a TE mode light radiation having a wavelength of 0.84 μm was projected on the optical waveguide device 10. In FIG. 1, incident light is indicated by an arrow a, light traveling through the optical waveguide 2 is indicated by an arrow b, and SHG light is indicated by an arrow c. The refractive index n of the KTP substrate 1 is 1.8396, the refractive index n of the $Ta_2O_5$ optical waveguide 2 is 2.172, and the refractive index difference $\Delta n$ is about 0.33. Thus, the optical waveguide device 10 generates blue SHG light having a wavelength of 0.42 μm at a high efficiency.

The Cerenkov radiation angle $\theta$ was 10°, which is small as compared to the radiation angle of 16° in the foregoing conventional optical waveguide device.

Figure 3:
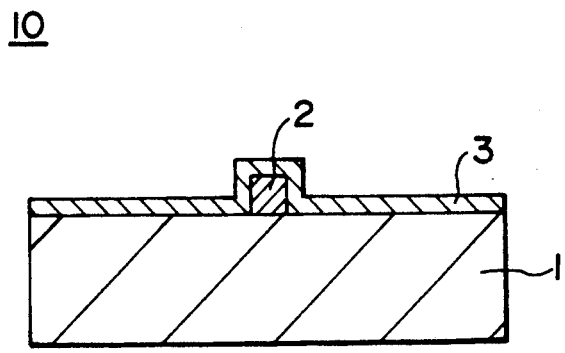

FIG. 3 is a sectional view of an optical waveguide device 10 in a second embodiment according to the present invention taken on a plane perpendicular to the direction of travel of light. As shown in FIG. 3, a ridge optical waveguide 2 of undoped $Ta_2O_5$ was formed, similar to that of the first embodiment, on a KTP single crystal a plate as a substrate 1. Then, an upper cladding layer 3 of $SiO_2$ having a refractive index n of 1.45 was formed over the entire area of the surface of the substrate 1 including the optical waveguide 2, for example, by a CVD process.

When TE mode laser light having a wavelength of 0.84 μm was projected on the optical waveguide device 10, the Cerenkov radiation angle θ was 6°, and blue SHG light having a wavelength of 0.42 μm was generated.

An optical waveguide device in a third embodiment according to the present invention was fabricated, similarly to the optical waveguide device in the second embodiment, by forming a ridge optical waveguide 2, which is similar to that in the first embodiment, by depositing undoped $Ta_2O_5$ on a KTP single crystal a-plate as a substrate 1, and then an upper cladding layer 3 was formed by depositing $Al_2O_3$ having a refractive index n of 1.6 over the entire area of the surface of the substrate 1 including the optical waveguide 2, for example by a CVD process.

When a TE mode laser beam having a wavelength of 0.84 μm was projected on the optical waveguide device, the Cerenkov radiation angle θ was about 2°, and blue SHG light was generated.

As is obvious from the second and third embodiments, the upper cladding layer 3 of an appropriate material, such as $Al_2O_3$, formed over the optical waveguide 2 reduced the Cerenkov radiation angle, which is inferred to be due to the increase of the propagation constant for a fundamental wave guided mode by the cladding layer 3.

Figure 5:
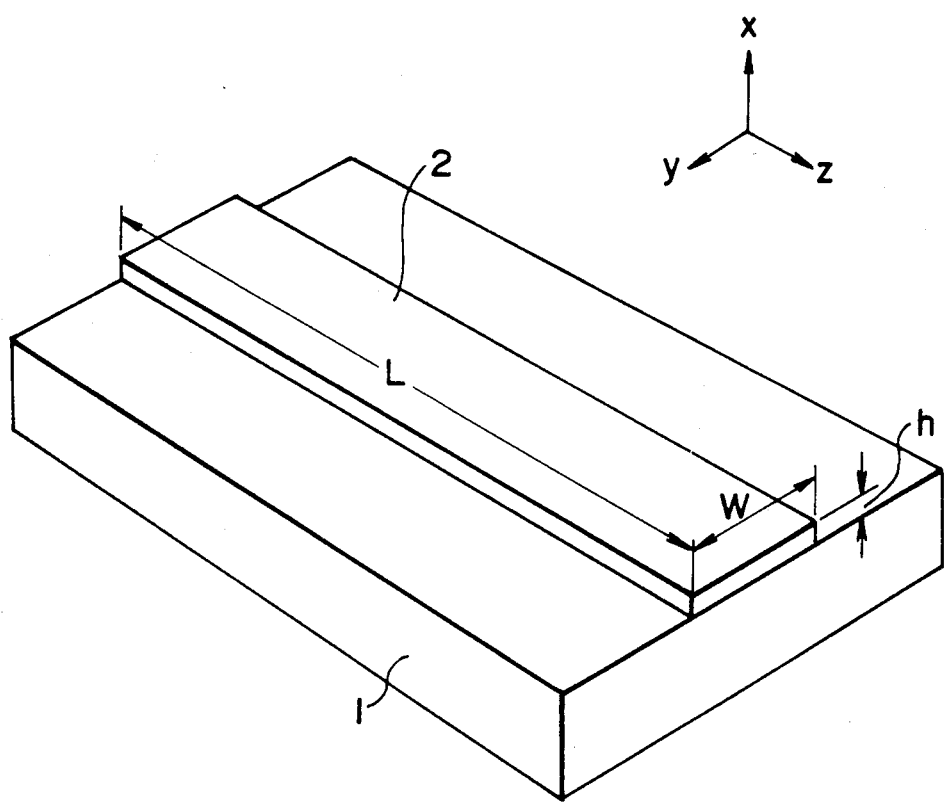
FIG. 5 is a perspective view of a Cerenkov radiation SHG device in a preferred embodiment according to the present invention.

FIG. 5 is a perspective view of a Cerenkov radiation optical SHG device embodying the present invention of FIG. 1.

In FIG. 5, the optical waveguide device 10 comprises a substrate 1, such as a $KTiOPO_4$ (KTP) single crystal a-plate (a single crystal plate having surfaces perpendicular to the a-axis of the crystal), and a channel optical waveguide 2 having the shape of a stripe formed, for example, of a $Ta_2O_5$ film, on the substrate 1 as explained in connection with FIG. 1.

By optimizing the width W, thickness h and length L of the optical channel waveguide formed of the $Ta_2O_5$ film, the Cerenkov radiation angle θ can be made not greater than 1°. For example, W=5 μm, h=2380Å and L=2.5 mm.

When a TE-mode laser light beam a having a wavelength of 865 nm was projected as shown in FIG. 1 on one end of the Cerenkov radiation optical SHG device directly or through an optical system, not shown, a SHG light radiation b having a wavelength of 432.5 nm (=865 nm/2) and a Cerenkov radiation angle of about 0.6° (central value) was generated. When the SHG light radiation b was condensed by an objective lens having an aperture number NA of 0.80 for a microscope, the SHG light radiation b formed a circular spot of about 0.6 μm in diameter.

Although the central value of the Cerenkov radiation angle is about 0.6°, the spreading of the Cerenkov radiation angle is a little less than 1°. The spread angle of the SHG light radiation in a transverse direction is a little less than 1°.

Figure 6:
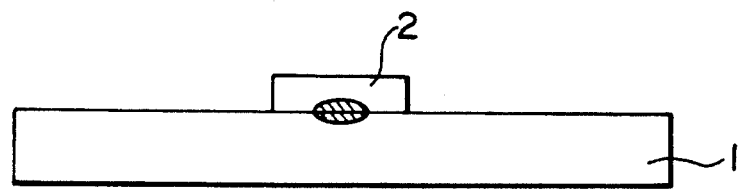
FIG. 6 is a view of a far field pattern of a SHG light radi generated by a Cerenkov radiation optical SHG device embodying the present invention.
Figure 6:

FIG. 6 shows the far field pattern of the SHG light radiation in such a state. A far field pattern of a SHG light radiation having a Cerenkov radiation angle of about 16° (alternate long and short dash line) is shown also in FIG. 6 for comparison. As is obvious from FIG. 6, the SHG light radiation generated by the Cerenkov radiation optical SHG device in this embodiment has a small, circular far field pattern, while the SHG light radiation having a Cerenkov radiation angle of 16° has a flat, crescent field pattern and has a very large spread angle in the transverse direction.

Thus, the Cerenkov SHG device in this embodiment fabricated by forming the stripe-shaped optical channel waveguide 2 of $Ta_2O_5$ film in an optimum width W and thickness h on the substrate 1 of a KTP single crystal a plate is capable of reducing the Cerenkov radiation angle to a small angle such as about 0.6°. Thus, the spreading of the Cerenkov radiation and the spread angle of the SHG light radiation in the transverse direction is an angle substantially equal to the Cerenkov radiation angle, i.e., about 0.6°. Accordingly, the SHG light radiation has a substantially circular far field pattern, and hence focusing characteristics of the SHG light radiation can be greatly improved. Therefore, the SHG light radiation need not be focused by a conical lens, which is an essential component of the conventional Cerenkov radiation optical SHG device; The SHG light radiation can satisfactorily be focused nearly to the limit of diffraction by an ordinary convex lens or the like.

Although some report say that the spread angle of the SHG light radiation in the transverse direction is univocally dependent on the width W of the channel optical waveguide 2, as stated above the spread angle of the SHG light radiation in the transverse direction is dependent also on parameters other than the width W of the optical channel waveguide 2, such as the thickness h and refractive index of the optical channel waveguide 2, and the spread angle in the transverse direction is not univocally dependent on the width W of the optical channel waveguide 2.

Although the performance of the Cerenkov radiation optical SHG device with the incident laser light having a wavelength of 865 nm has been described, it is also possible to provide a Cerenkov radiation optical SHG device capable of generating a SHG light radiation having a Cerenkov radiation angle on the order of 0.6° with an incident light radiation of a wavelength other than 865 nm by providing the Cerenkov radiation optical SHG device with a optical channel waveguide 2 having an appropriate width W, and thickness h.

Figure 7:
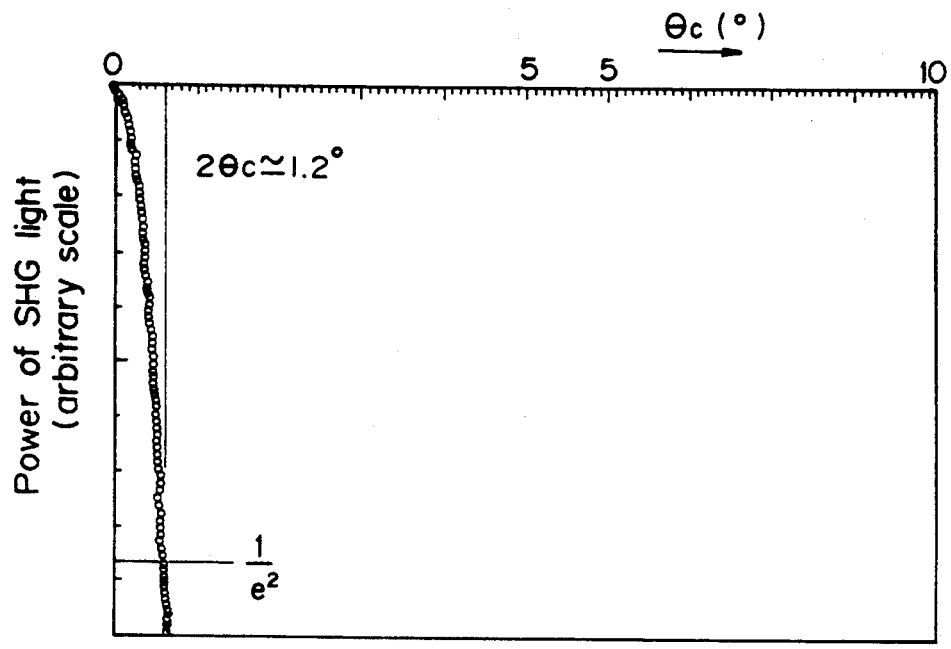
FIG. 7 is a graph showing the relation between the power of a SHG light radiation generate a Cerenkov radiation device embodying the present invention and $\theta c$.
Figure 8:
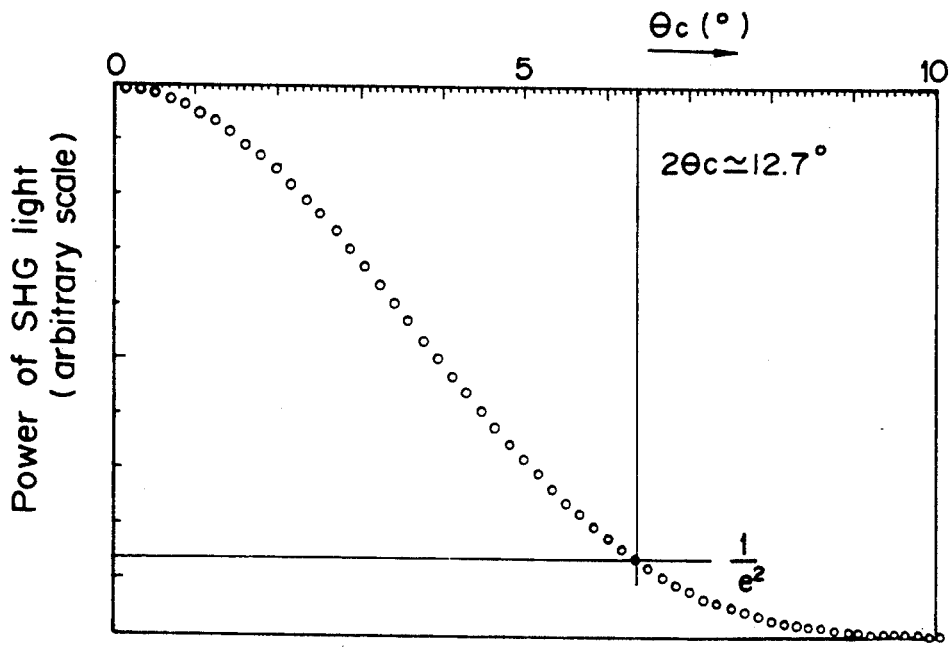
FIG. 8 is a graph showing the relationship between the power of a SHG light radiation generated by a conventional Cerenkov radiation optical SHG device and $\theta c$.
Figure 9:
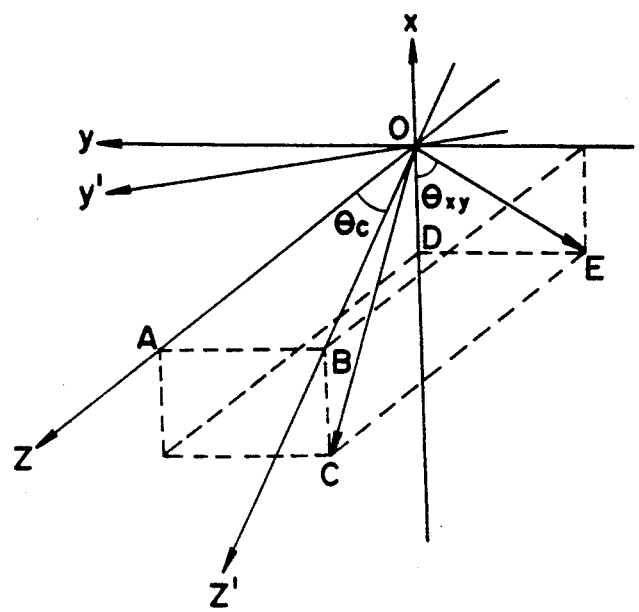
FIG. 9 is a diagrammatic view for assisting in explaining the definition of $\theta c$.
Figure 10:
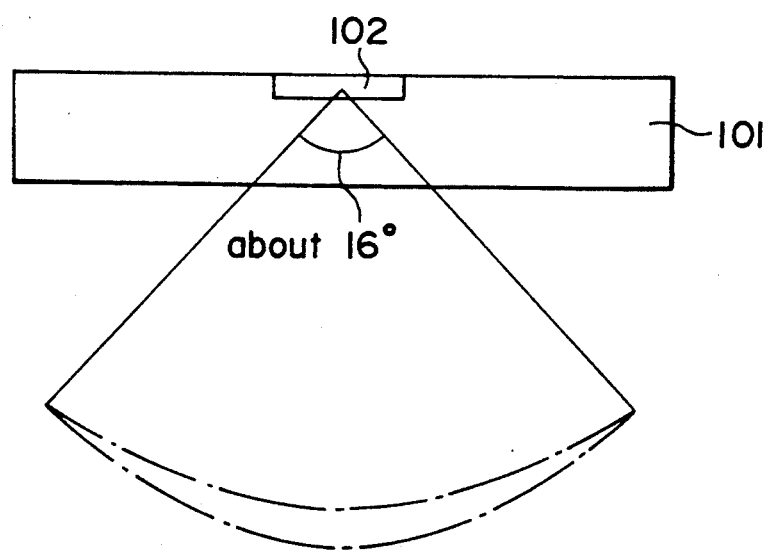
FIG. 10 is a sectional view of a conventional Cerenkov radiation SHG device.

FIG. 7 is a graph showing the relationship between the power of a SHG light radiation generated by the Cerenkov radiation optical SHG device in this embodiment and having a Cerenkov radiation angle θ on the order of 0.6° and an angle $θ_c$, which is the projection of the Cerenkov radiation angle θ on a z-y plane parallel to a plane including the optical waveguide 2 as shown in FIG. 9. In FIG. 9, a direction OC is the direction of travel of the SHG light radiation. FIG. 8 shows the relation between the power of a SHG light radiation having a Cerenkov radiation angle θ on the order of 16° generated by the conventional Cerenkov radiation optical SHG device shown in FIG. 10 fabricated by forming a proton-exchanged $LiNbO_3$ optical waveguide 102 on a substrate 101 formed of a $LiNbO_3$ single crystal z plate, and $θ_c$, for comparison.

As is obvious from FIG. 7, the power of the SHG light radiation having a Cerenkov radiation angle on the order of 0.6° generated by the Cerenkov radiation optical SHG device in this embodiment is concentrated in a narrow range of $θ_c$, and hence the SHG light radiation has a very high luminance. The power of the SHG light radiation having a Cerenkov radiation angle on the order of 16° generated by the conventional Cerenkov radiation optical SHG device is distributed in a wide range of $\theta_c$ as shown in FIG. 8, and hence the SHG light radiation has a very low luminance as compared with that of the SHG light radiation generated by the Cerenkov radiation optical SHG device embodying the present invention.

The undoped $Ta_2O_5$ film employed as the optical waveguide 2 in the foregoing embodiments is formed dependent only on the temperature of the KTP substrate because $Ta_2O_5$ is a simple single-element oxide, and hence the undoped $Ta_2O_5$ film can stably be formed with excellent reproducibility. Being simple single-element oxides, the optical waveguide 2 and the upper cladding layer 3 employed in the third embodiment can be stably formed with excellent reproducibility.

An optical waveguide 2 formed of $Ta_2O_5$ doped with $TiO_2$ provides an increased refractive index difference $\Delta n$ and further enhances the SHG efficiency.

Figure 4:
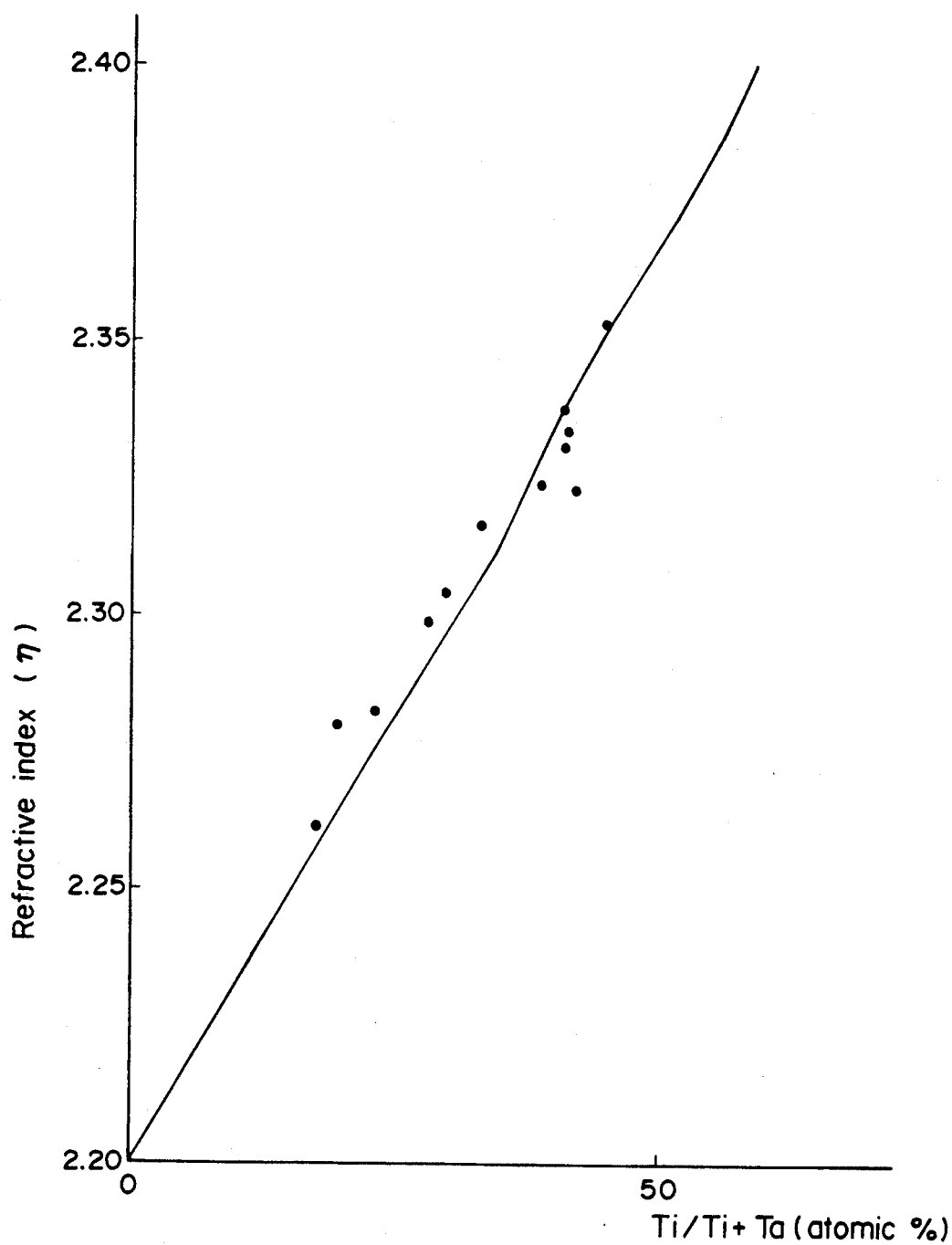
FIG. 4 is a graph showing the refractive index change in accordance with Ti content in $TiO_2$ doped $Ta_2O_5$ film.

FIG. 4 is a graph showing the variation of the refractive index for light having a wavelength of 0.6328 $\mu m$ of a waveguide formed of $Ta_2O_5$ doped with $TiO_2$ with the Ti content, in which the abscissa represents the ratio $Ti/(Ti+Ta)$ (atomic percent) and the ordinate represents the refractive index n. The plots represent measured data. As is apparent from FIG. 4, the refractive index n increases in proportion to the Ti content, the refractive index is 2.2 even when the Ti content is null, and hence the refractive index difference $\Delta n$ can sufficiently be large. When $Ti/(Ti+Ta)$ exceeded 60 atomic percent, crystallization occurred. Therefore, a satisfactory amorphous optical waveguide 2 can be formed when $0 \leq Ti/(Ti+Ta) \leq 60$.

Although the foregoing embodiments have been described as applied to SHG, it is possible to apply the present invention to optical waveguide devices for various other optical communication equipments and optical integrated circuits. Having a large difference of the refractive index $\Delta n$, the optical waveguide device of the present invention is capable of operating at a high light confinement efficiency and at a high light guide effective when applied to such purposes.

As is apparent from the foregoing description, according to the present invention, the amorphous optical waveguide 2 of $Ta_2O_5$ or $Ta_2O_5$ doped with $TiO_2$ is formed on a $KTiOPO_4$ (KTP) single crystal substrate 1 as shown in FIG. 1 to make a refractive index difference $\Delta n$ between the substrate 1 and the optical waveguide 2 as large as 0.33 to 0.42. Thus, the optical waveguide device in accordance with the present invention is capable of generating SHG light at a high efficiency.

Whereas SHG by the conventional ion-exchanged optical waveguide device employing a KTP crystal substrate is unable to generate SHG light in a blue light wavelength range, the optical waveguide device in accordance with the present invention is able to generate satisfactory SHG light in a blue light wavelength range.

The use of a KTP substrate reduced the Cerenkov radiation angle to 10° or below. The upper cladding layer 3 of an appropriate material, such as $Al_2O_3$, $(SiO_2)_{1-x}(Ta_2O_5)_x$, formed over the optical waveguide 2 enabled further reduction of the Cerenkov radiation angle. Accordingly, even if the length of the substrate 1 along the direction of travel of light is increased to increase the length of the waveguide for enhancing the SHG efficiency $\eta$, the increase of the thickness of the substrate 1 to avoid troubles attributable to the reflection of the Cerenkov radiation by the backside of the substrate or the complication of the focusing optics are unnecessary, the SHG characteristics are improved, and an optical recording and reproducing apparatus employing the optical waveguide device can be formed in a simple construction.

Furthermore, as stated with reference to the first to third embodiments, when the optical waveguide 2 is formed of undoped $Ta_2O_5$, the $Ta_2O_5$ film can be formed with excellent reproducibility in a rate-determined state dependent only on the temperature of the KTP substrate, because $Ta_2O_5$ is a simple single-element oxide. Still further, when both the optical waveguide 2 and the upper cladding layer 3 are formed of simple single-element oxides as in the third embodiment, the reproducibility of the film forming process can be stabilized.

Although various minor changes and modifications might be proposed by those skilled in the art, it will be understood that we wish to include within the claims of the patent warrented hereon all such changes and modifications as reasonably come within one contribution to the art.

We claim as our invention:

1. An optical waveguide device, comprising: a $KTiOPO_4$ single crystal substrate, and an amorphous optical waveguide formed of $Ta_2O_5$ or $Ta_2O_5$ doped with $TiO_2$ directly on an upper surface of the substrate.

2. An optical waveguide device according to claim 1 wherein said amorphous optical waveguide is a channel optical waveguide.

3. An optical waveguide device according to claim 1 further comprising a cladding layer formed over said substrate and said amorphous optical waveguide.

4. An optical waveguide device according to claim 1 wherein said optical waveguide is formed of only a single layer.

5. A second harmonic generator, comprising: a $KTiOPO_4$ single crystal substrate, and an amorphous optical waveguide formed of $Ta_2O_5$ or $Ta_2O_5$ doped with $TiO_2$ directly on an upper surface of the substrate, one end of said amorphous optical waveguide being supplied with an input light having an angular frequency of $\omega$, and generating a second harmonic light having an angular frequency of $2\omega$ with a Cerenkov angle $\theta$.

6. A second harmonic generator according to claim 5 wherein said Cerenkov angle $\theta$ is not larger than 1 degree.

7. A second harmonic generator according to claim 5 wherein said Cerenkov angle $\theta$ is not larger than 1 degree, and a spread angle of said second harmonic light in a transverse direction is substantially equal to said Cerenkov angle.

8. A second harmonic generator according to claim 5 wherein said amorphous optical waveguide is a channel optical waveguide.

9. A second harmonic generator according to claim 5 wherein a cladding layer is formed over said substrate and said amorphous optical waveguide.

10. A second harmonic generator according to claim 5 wherein said amorphous optical waveguide is formed of only a single layer.

11. An optical waveguide device, comprising: a $KTiOPO_4$ single crystal substrate, and an amorphous optical waveguide formed of $Ta_2O_5$ or of $Ta_2O_5$ doped with $TiO_2$.

12. A second harmonic generator, comprising: a $KTiOPO_4$ single crystal subtrae, and an amorphous optical waveguide formed of $Ta_2O_5$ or $Ta_2O_5$ doped with $TiO_2$, one end of said amorphous optical waveguide being supplied with an input light having an angular frequency of $\omega$, and generating a second harmonic light having an angular frequency of $2\omega$ with a Cerenkov angle $\theta$.

* * * * *